(12) United States Patent
West

(10) Patent No.: US 11,439,135 B2
(45) Date of Patent: Sep. 13, 2022

(54) FISHING CAMERA ASSEMBLY

(71) Applicant: SIREN CAMERAS PTY LTD, Albion (AU)

(72) Inventor: Philip West, Albion (AU)

(73) Assignee: SIREN CAMERAS PTY LTD, Albion (AU)

( * ) Notice: Subject to any disclaimer, the term of this patent is extended or adjusted under 35 U.S.C. 154(b) by 22 days.

(21) Appl. No.: 16/633,066

(22) PCT Filed: Jul. 17, 2018

(86) PCT No.: PCT/AU2018/050742
§ 371 (c)(1),
(2) Date: Jan. 22, 2020

(87) PCT Pub. No.: WO2019/023738
PCT Pub. Date: Feb. 7, 2019

(65) Prior Publication Data
US 2020/0163319 A1    May 28, 2020

(30) Foreign Application Priority Data

Aug. 1, 2017 (AU) .................. 2017903050
Oct. 11, 2017 (AU) .................. 2017904100

(51) Int. Cl.
| | |
|---|---|
| *A01K 97/00* | (2006.01) |
| *A01K 91/06* | (2006.01) |
| *G03B 17/08* | (2021.01) |
| *G03B 17/56* | (2021.01) |

(52) U.S. Cl.
CPC .............. *A01K 97/00* (2013.01); *A01K 91/06* (2013.01); *G03B 17/08* (2013.01); *G03B 17/561* (2013.01)

(58) Field of Classification Search
USPC .......................................... 348/81
See application file for complete search history.

(56) References Cited

U.S. PATENT DOCUMENTS

| | | | |
|---|---|---|---|
| 9,507,243 B2 | 11/2016 | Bianciardi | |
| 10,706,703 B1 * | 7/2020 | Barr ................. | G08B 13/08 |
| 2007/0100200 A1 * | 5/2007 | Suzuki ............ | A61B 1/00151 |
| | | | 600/101 |
| 2013/0051779 A1 | 2/2013 | Londeree et al. | |
| 2013/0107031 A1 | 5/2013 | Atkinson | |
| 2016/0119065 A1 | 4/2016 | Tobias | |
| 2018/0162503 A1 * | 6/2018 | Reid ................ | B63G 8/001 |

FOREIGN PATENT DOCUMENTS

| | | |
|---|---|---|
| CN | 202794801 U | 3/2013 |
| WO | 2015188832 A1 | 12/2015 |

* cited by examiner

*Primary Examiner* — Mikhail Itskovich
(74) *Attorney, Agent, or Firm* — Peter W. Peterson; DeLio Peterson & Curcio LLC

(57) ABSTRACT

The present invention relates to a fishing camera assembly for coupling to a fishing line. The assembly includes a camera and a carrier for carrying the camera along the line. The carrier includes an openable surround (e.g. tube) that surrounds the line. Advantageously, the surround can be opened to readily release the camera from the line thereby reducing complication to the angler's tackle set-up.

19 Claims, 9 Drawing Sheets

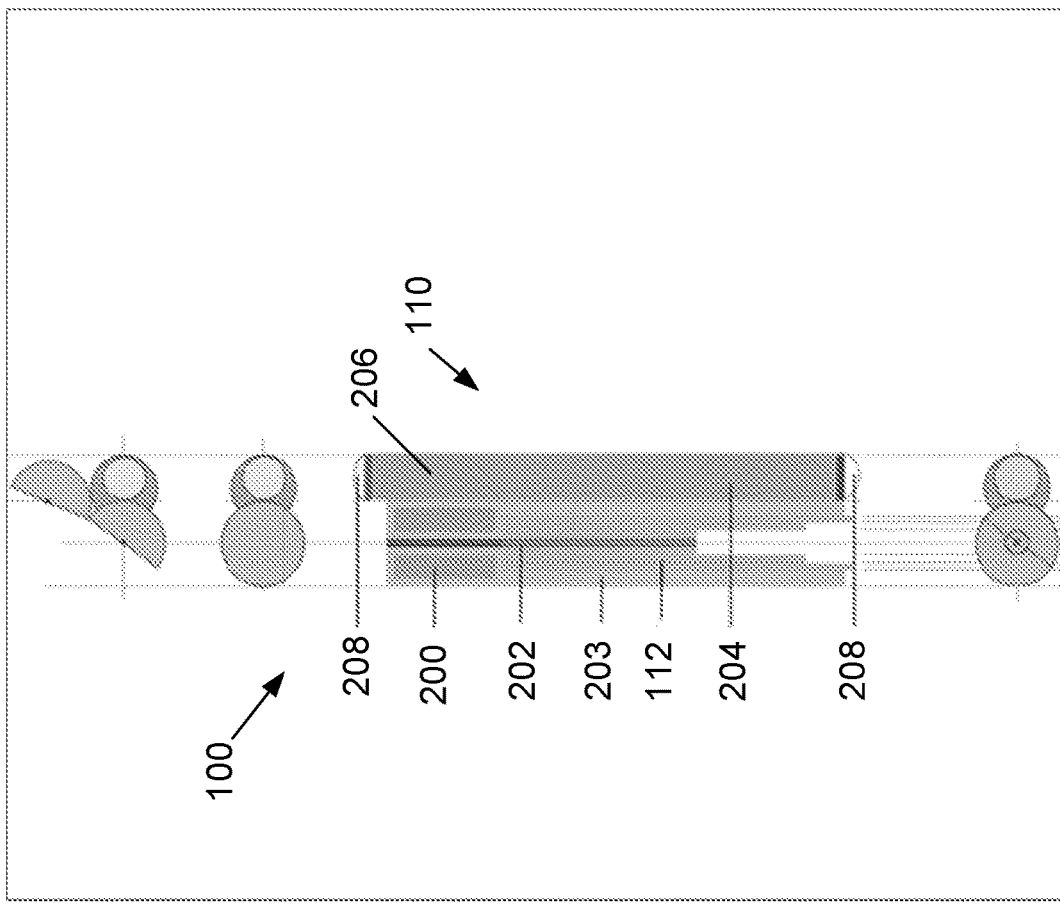
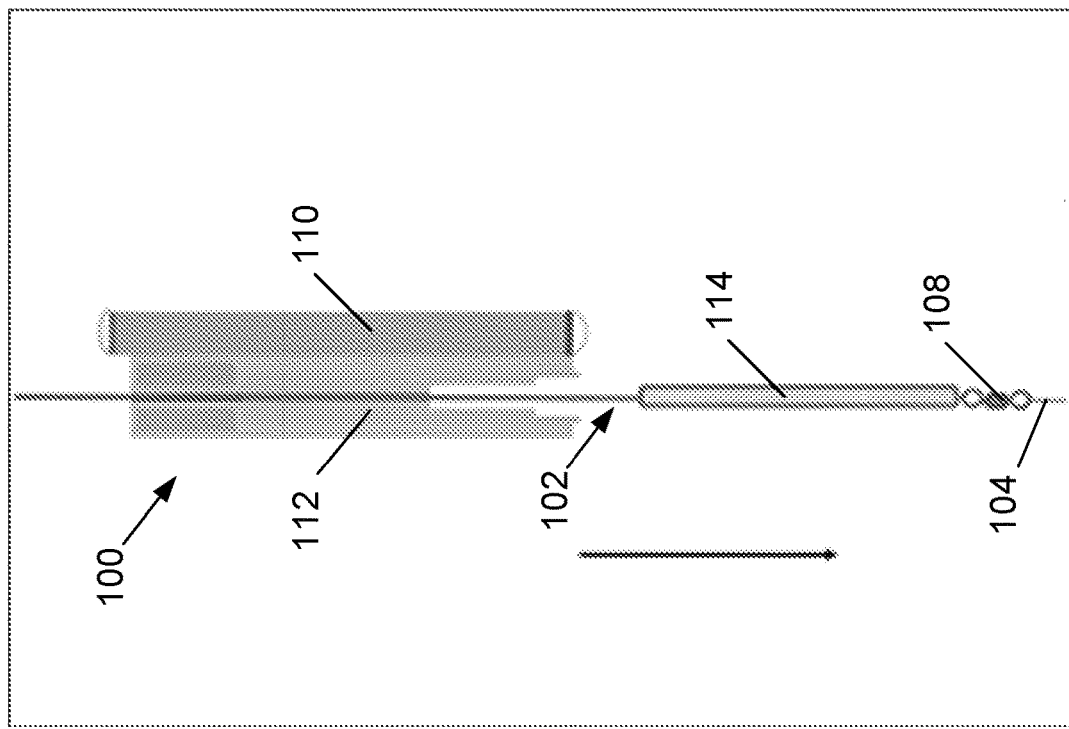

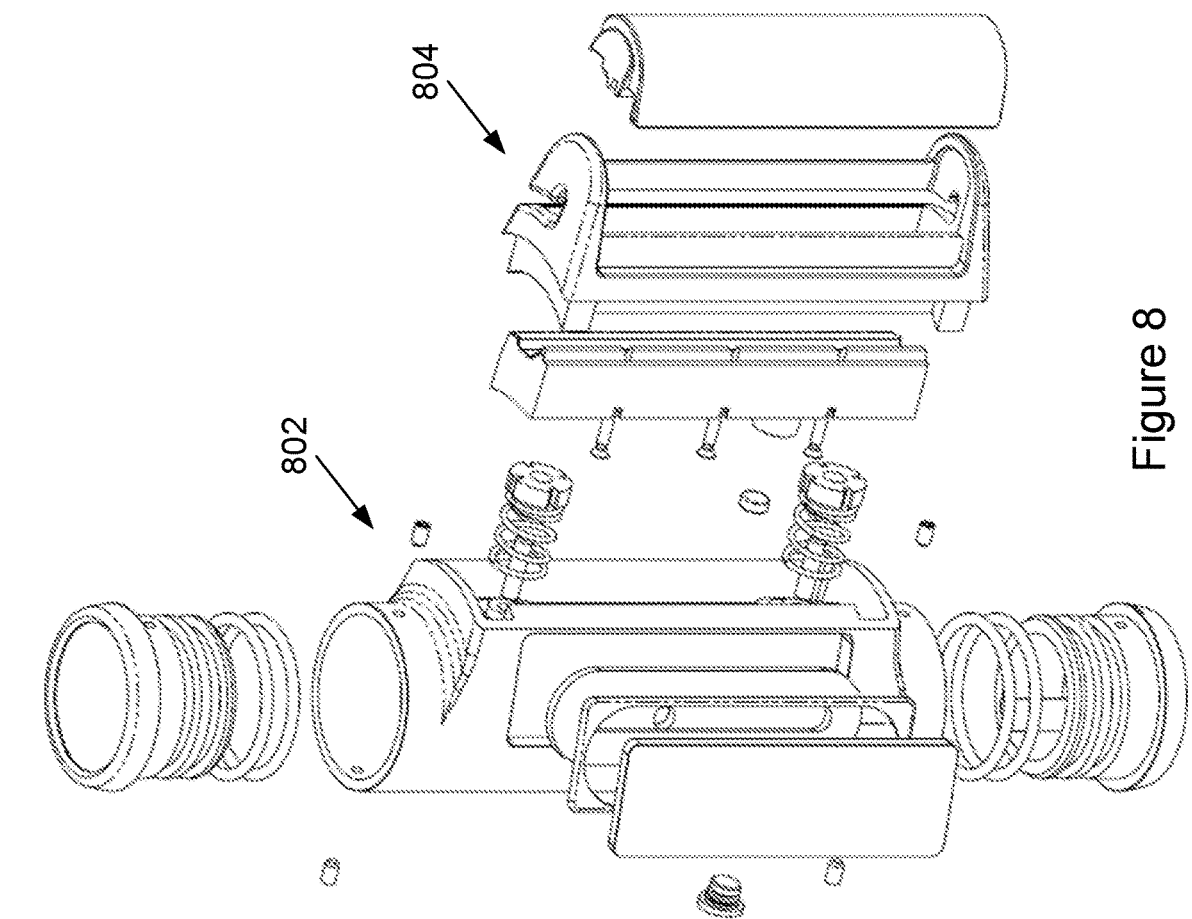
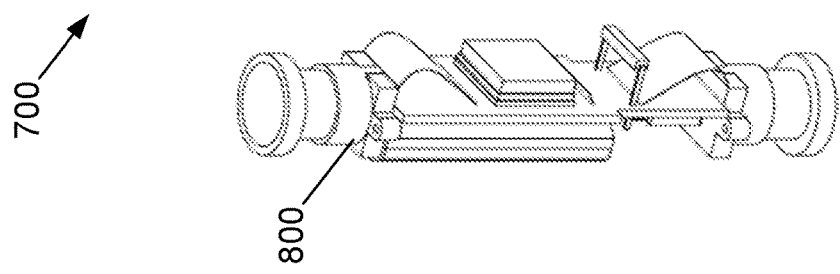
Figure 8
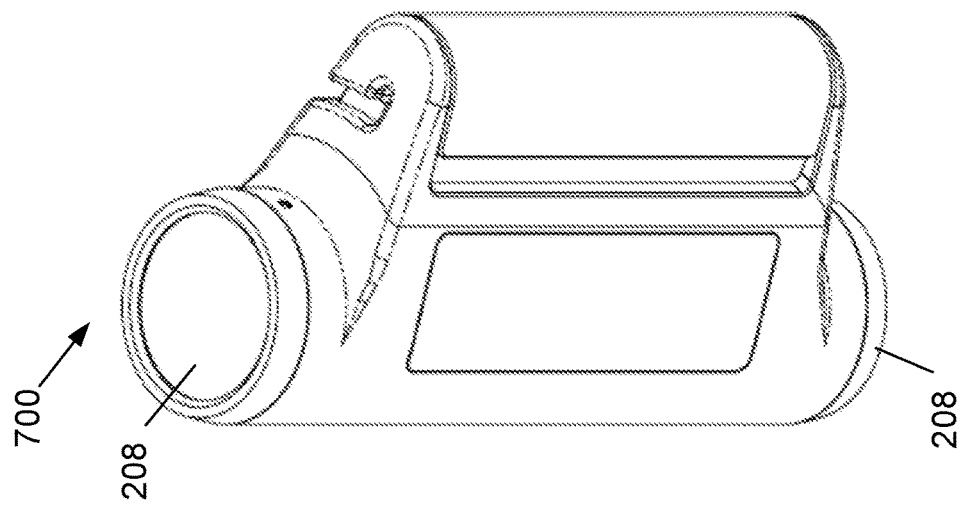
Figure 7

FISHING CAMERA ASSEMBLY

TECHNICAL FIELD

The present invention generally relates to a fishing camera assembly.

BACKGROUND

The reference to any prior art in this specification is not, and should not be taken as an acknowledgement or any form of suggestion that the prior art forms part of the common general knowledge.

Underwater cameras have been recently introduced to the recreational fishing industry. These cameras are permanent fixtures on the fishing line with intention of capturing fish behavior, fish interaction with the anglers' lure, and action shots once the fish is hooked.

However, the Applicant has perceived drawbacks when the camera is a permanent fixture such as added complication to the angler's tackle set-up, additional knots/components/weak points in the line, reduced strike rates, camera attack from fish, limitation of a single camera to a single fishing line, and inevitable camera loss.

The preferred embodiment provides an alternative means for ameliorating at least one of the foregoing drawbacks, or at least providing consumers with a useful commercial choice.

SUMMARY OF THE INVENTION

According to one aspect of the present invention, there is provided a fishing camera assembly for coupling to a fishing line, the assembly including:
 a camera;
 a weight for weighting the camera to pass along the fishing line; and
 a release for releasing the camera from the weight.

Preferably, the camera is buoyant. The camera may be movably fastened to the line. The camera may include a tube that surrounds the line. The camera may include two hingedly connected parts. The camera may be movably coupled to the fishing line so as to float to the surface along the line upon release from the weight. The camera may include a float. The float may be located above the weight to facilitate release. The float may surround the line. The camera may be configured to capture one or more images downward along the line. The camera may be configured to capture one or more images upward along the line. The camera may include a housing for housing an image capture device, the housing being buoyant and located adjacent the line so that the housing is generally located above the line when angled. The housing may be located adjacent and above the weight to when the assembly rests on the seabed.

The camera may include a transmitter for transmitting the captured images. The assembly may further include a receiver for receiving and displaying the captured images. The receiver may include a mobile phone.

The release may include a propulsion means to propel the camera from the weight. The propulsion means may include a spring.

The weight may be movably fastened to the line. The weight may include a tube that surrounds the line. The tube may include two hingedly connected parts.

The assembly may include a stop on the line, and the release may be triggered responsive to the moving weight reaching the stop. The weight may form a complementary fit with the stop. The stop may be received in the weight. The weight and stop may be drawn together by magnetic attraction. The stop may include a tube through which the line passes. Alternatively or additionally, the assembly may include a timer and the release may be triggered after a predetermined duration.

The assembly may further include application software configured to: locate the camera, store received images from the camera, edit images from the camera, share images from the camera, or log fishing co-ordinates and water temperatures associated with captured images from the camera.

The camera may include an override for inhibiting the release of the weight. The camera and/or weight may include a fin to inhibit rotation during decent along the line.

According another aspect of the present invention, there is provided a fishing method including:
 weighting a camera with a weight so as to pass along a fishing line; and
 releasing the camera from the weight.

According to another aspect of the present invention, there is provided a fishing camera assembly for coupling to a fishing line, the assembly including:
 a camera; and
 a carrier for carrying the camera along the line, the carrier including an openable surround that surrounds the line.

Advantageously, the surround can be opened to readily release the camera from the line thereby reducing complication to the angler's tackle set-up.

The surround may be compressed to open and receive the line, before being released to close the surround. The surround may include biasing means for biasing the surround closed.

Preferably, the surround includes a tube. The surround may include a static part, and a movable part for moving relative to the static part. The movable part may move linearly relative to the static part. The parts may define a lateral channel for receiving the line. The lateral channel may be formed when the parts are moved toward each other.

The assembly may further include an actuator for actuating the camera. The actuator may be a toggle actuator. The toggle actuator may be configured to begin recording of the camera when the surround is opened, and stop recording of the camera when the surround is opened once more. The actuator may include a proximity switch. The proximity switch may be magnetic.

The assembly may further include a battery, and a charger for charging the battery. The charger may be an induction charger. The charger may include a wireless charging coil. The coil may be located adjacent a resting surface of the carrier.

The assembly may further include a temperature sensor borne by a submerged portion of the carrier when floating for sensing the water temperature. The assembly may further include a stabilizer for stabilizing the orientation of the camera as the carrier moves. The stabilizer may include a mechanical gyro. The assembly may further include a GPS and clock.

The assembly may include a transmitter for transmitting information including one or more of: the sensed water temperature, GPS co-ordinates from the GPS and time and date from the clock. The assembly may further include application software configured to receive the transmitted information from the assembly as well as associated caught fish species to build a fish database for fish conservation purposes.

The camera and carrier may form a camera unit, and the assembly may further include:

a weight for weighting the camera unit to pass along the fishing line; and a release for releasing the camera unit from the weight.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 1 is a schematic side sectional view of a fishing camera assembly travelling down a fishing line in accordance with an embodiment of the present invention;

FIG. 2 is an orthographic drawing of the assembly of FIG. 1;

FIG. 7 is a perspective view of a fishing camera assembly in accordance with another embodiment of the present invention;

FIG. 8 is an exploded view of the fishing camera assembly of FIG. 7;

DETAILED DESCRIPTION OF PREFERRED EMBODIMENTS

Figure 4:
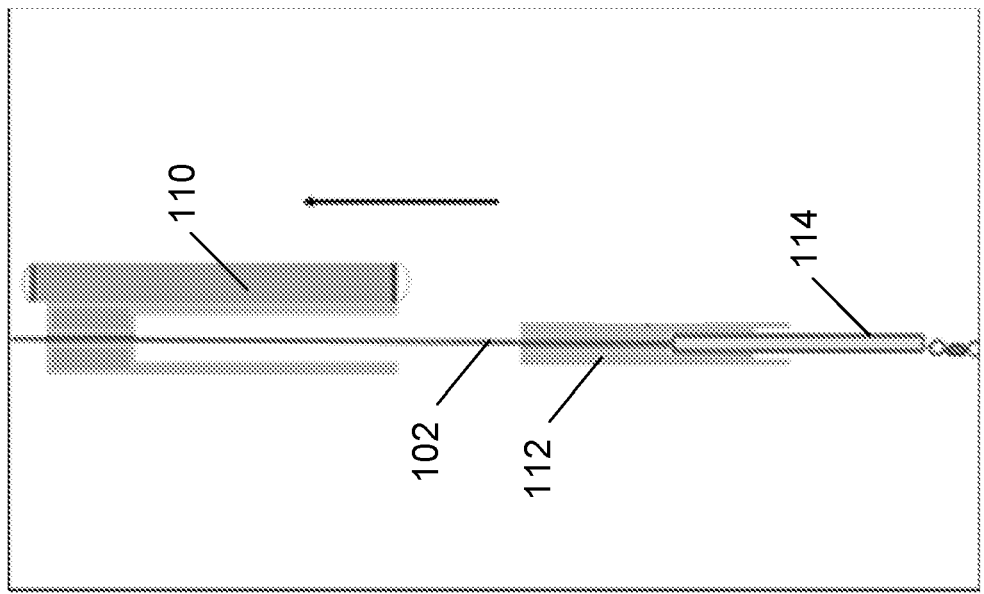
FIG. 4 is a side sectional view showing release of a camera of the stopped assembly of FIG. 3 from a weight.

According to an embodiment of the present invention, there is provided a fishing camera assembly 100 for coupling to a fishing line 102 as shown in FIG. 1. The fishing line 102 includes a leader 104 using a swivel 108.

The assembly 100 includes a buoyant camera 110 to capture images of a fish on the line 102, and a weight 112 for weighting the camera 110 to pass down along the fishing line 102 toward the fish. A release is provided for automatically releasing the camera 110 from the weight 112 once images of the fish have been captured for an angler to view, so that the floating camera 110 is retrieved prior to a breakage of the fishing line 102. The assembly 100 further includes a tubular stop 114 fed onto the line 102 adjacent the swivel 108, and the release is typically triggered responsive to the moving weight 112 engaging with the stop 114.

Advantageously, the angler not only receives underwater footage of the hooked fish, but most importantly a safe return of the submersible camera 110 even in circumstance of line break. In this manner, the angler can positively identify prize fish commonly lost during the fight, and the assembly 100 acts to compensate against extreme disappointment felt when an opportunity is missed to land the fish, creating a second phase of excitement by extending the angler's fishing experience through having ability to discover size and species of any lost fish.

Turning to FIG. 2, the camera 110 includes a float 200 which is located above the weight 112 to facilitate release. The tubular float 200 and weight 112 can be movably fastened to slide along the line 102 passing through passage 202. In particular, the float 200 and weight 112 each include two hingedly connected parts that snap together to form a tube that surrounds the line 102. The float 200 and weight 112 can be contained in a separable housing 203.

The camera 110 also includes an elongate housing 204, located adjacent the float 200, for housing an internal image capture device. The housing 204 includes an upper float 206 so as to increase buoyancy. Either end of the housing 204 is fitted with a camera lens 208. The camera 110 is configured to capture video images downward along the line 102 as well as upward along the line 102. In this manner, the assembly 100 captures 'fish-eye-view' action footage of the angler and fishing surroundings, providing new perspectives to fishing action shots. This is achieved by capturing footage in the direction of the angler while the camera body returns to surface, and while floating on the surface as the angler retrieves a hooked fish.

The female weight 112 receives and forms a complementary fit with the male stop 114. The weight 112 includes a permanent magnet and the metal stop is drawn into the weight 112. Upon engagement of the weight 112 with the stop 114, the release is automatically triggered. The release includes a propulsion means in the form of a spring to propel the camera 200 from the weight 112. The assembly further includes a timer which triggers the release after a predetermined duration (e.g. five minutes).

The camera 110 also includes a wireless (e.g. Bluetooth or WI-FI) transmitter for transmitting the captured images. The assembly 100 further includes mobile phone for receiving and displaying the captured images. The phone is loaded with application software (i.e. an App) configured to: locate the camera 110 using the transmitted signal, store received images from the camera 110, edit images from the camera 110, share images from the camera 110, log water temperature from the temperature sensor probe or thermocouple, and log fishing co-ordinates using the phone GPS associated with captured images from the camera 110.

A fishing method using the assembly 100 is now briefly described.

Initially, a fish is hooked on the line 102 with the free running stop 114 in place. The stop 114 is nonintrusive and does not dissuade the fish.

The angler then fastens the assembly 100 to the line 102 at the rod tip. The angler does so by snapping together, with a single hand, the hingedly connected parts of the float 200 and weight 112 to form a tube that surrounds the line 102. A magnet can be used to snap lock the parts together which initiates capturing of the images by the camera 110. Alternatively, a separate actuator may be provided to initiate capturing. A visual and or audio indicator of the camera 110 (e.g., flashing light or beep) may signal image capture to the angler who then lets the assembly 100 go.

The camera 110, weighted with the weight 112 and now having overall negative buoyancy, passes downward along the fishing line 102 toward the fish, as shown in FIG. 1. The camera 110 captures and transmits downward images through the bottom lens 208 including images of the approaching fish. The tension of the line 102 provided by the hooked fish provides stability in capturing quality video footage and minimizes erratic camera angles associated with alternative permanent fixture cameras.

Figure 3:
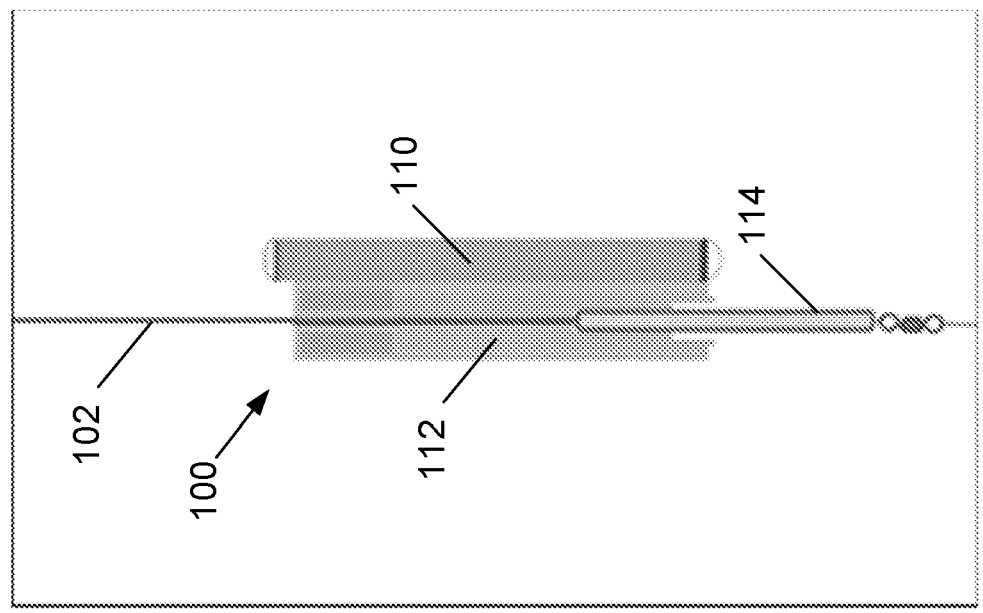
FIG. 3 is a side sectional view showing the fishing camera assembly of FIG. 1 engaging a stop.

As shown in FIG. 3, the assembly 100 receives and is seated on the stop 114 which triggers the propelled release. The ascending camera 110 then captures and transmits upward images through the top lens 208 including images of the angler when it penetrates the water surface.

As shown in FIG. 4, the release separates the buoyant camera 110 from the weight 112. The inexpensive weight 112 remains on the stop 114, whereas the more expensive camera 110 floats along the line 102 and back to the water surface.

Figures 5, 6:
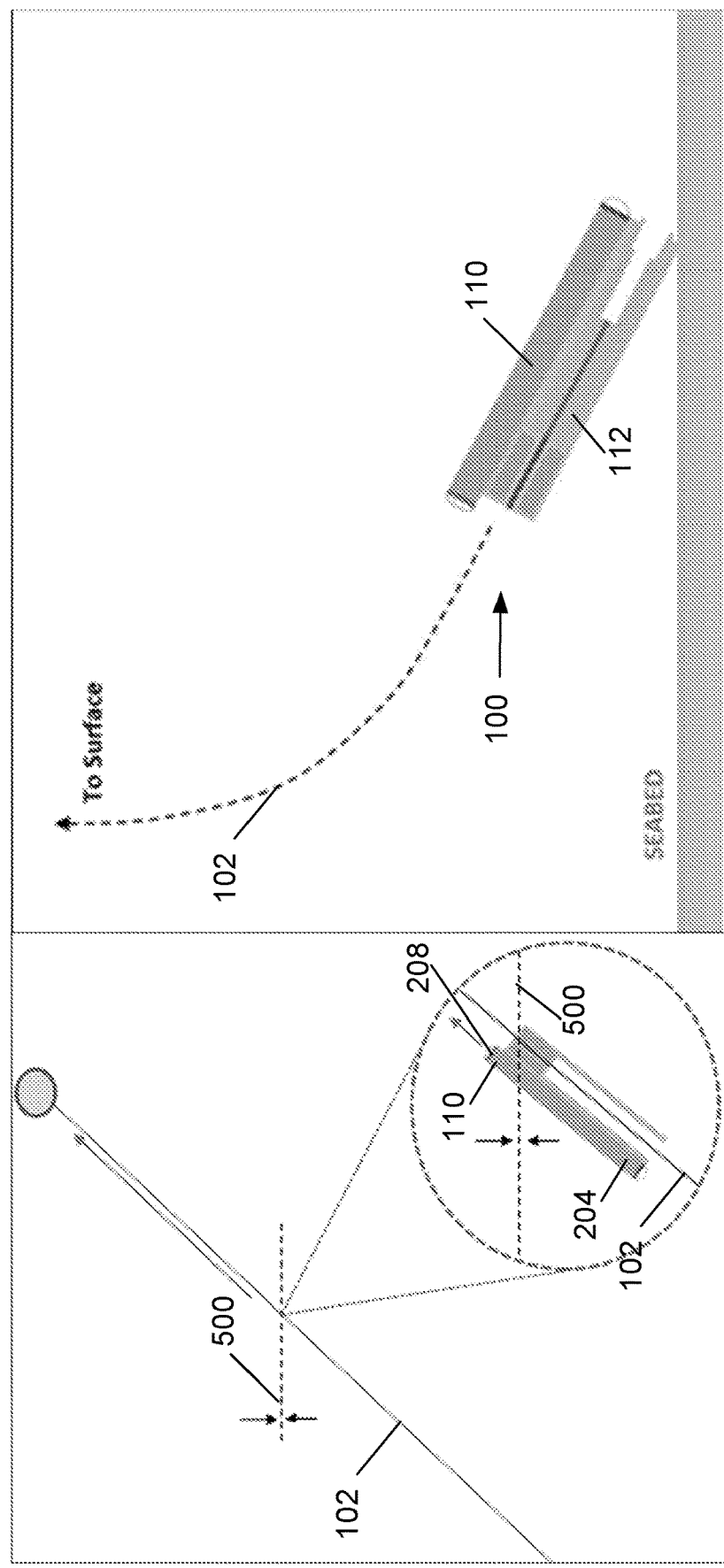
FIG. 5 is a schematic view of the released camera of FIG. 4 floating on the water surface.
FIG. 6 is a schematic view of the assembly of FIG. 1 sitting on a seabed when the line is absent.

Turning to FIG. 5, it is apparent that the elongate camera housing 204 is located adjacent and above the angled line 102 so that the top lens 208 is clear of the water surface when capturing images of the angler. These images of the angler fighting with the hooked fish provide for exciting and unique footage serving to highlight the angler's experience and memories.

Upon landing the fish, the camera 110 and weight 112 are retrieved by the angler by opening the hinged portions to release them from the line 102. The camera actuator is actuated to stop image capture. If the line breaks during the fight and the fish gets away, the weight 112 may be lost but the floating camera 110 located proximal to the angler can still be retrieved.

As shown in FIG. 6, in the event of a premature line break before the camera 110 is released, the assembly 100 rests on the seabed with the camera housing 204 located adjacent and above the weight 112 to facilitate release when the timer triggers release after a predetermined period of time. The dashed line represents the trajectory of the camera 110 to the water surface upon release.

According to another embodiment of the present invention, there is provided a fishing camera assembly 700 for coupling to the fishing line 102 as shown in FIG. 7.

As can best be seen in FIG. 8, the assembly 700 includes a camera 800, and a carrier 802 for carrying the camera 800 along the line 102. The carrier 802 includes an openable and closeable tube 804 (i.e. surround) that surrounds the line 102.

Advantageously, the closed tube 804 can be opened along its side to readily release the camera 800 from the line 102 thereby reducing complication to the angler's tackle set-up. The carrier 802 also fully encloses and houses the camera 800, and other electronics, with a watertight seal to provide electronic longevity in a harsh marine environment.

Figure 9:
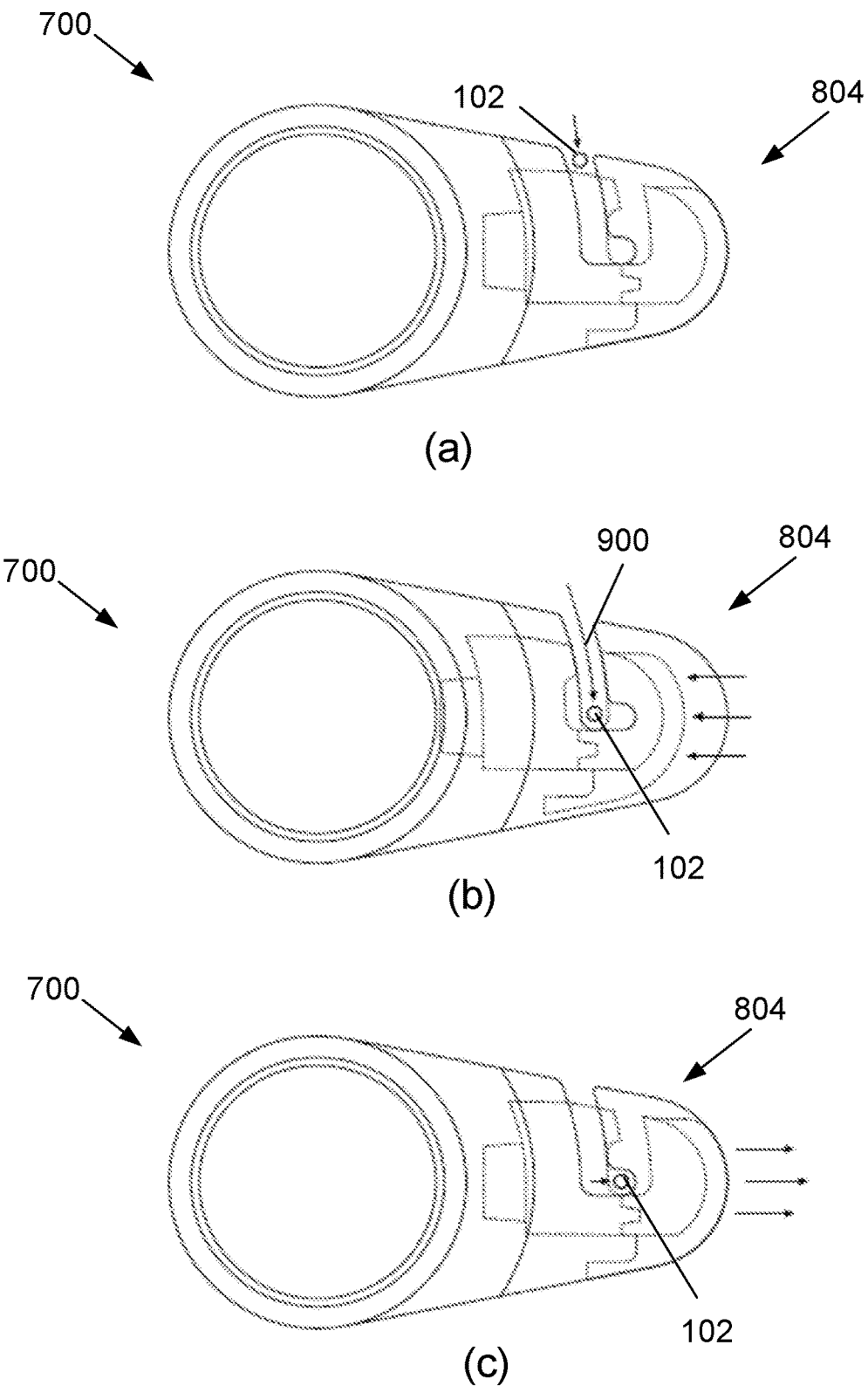
FIGS. 9a-c show end views of the fishing camera assembly of FIG. 7 during line attachment.

As can best be seen in FIGS. 9a to 9b, the tube 804 is compressed (or squeezed) to open and receive the line 102 in a lateral channel 900, before being released to close the tube 804 and slidably contain the line 102 as shown in FIGS. 9b to 9c.

Figure 10:
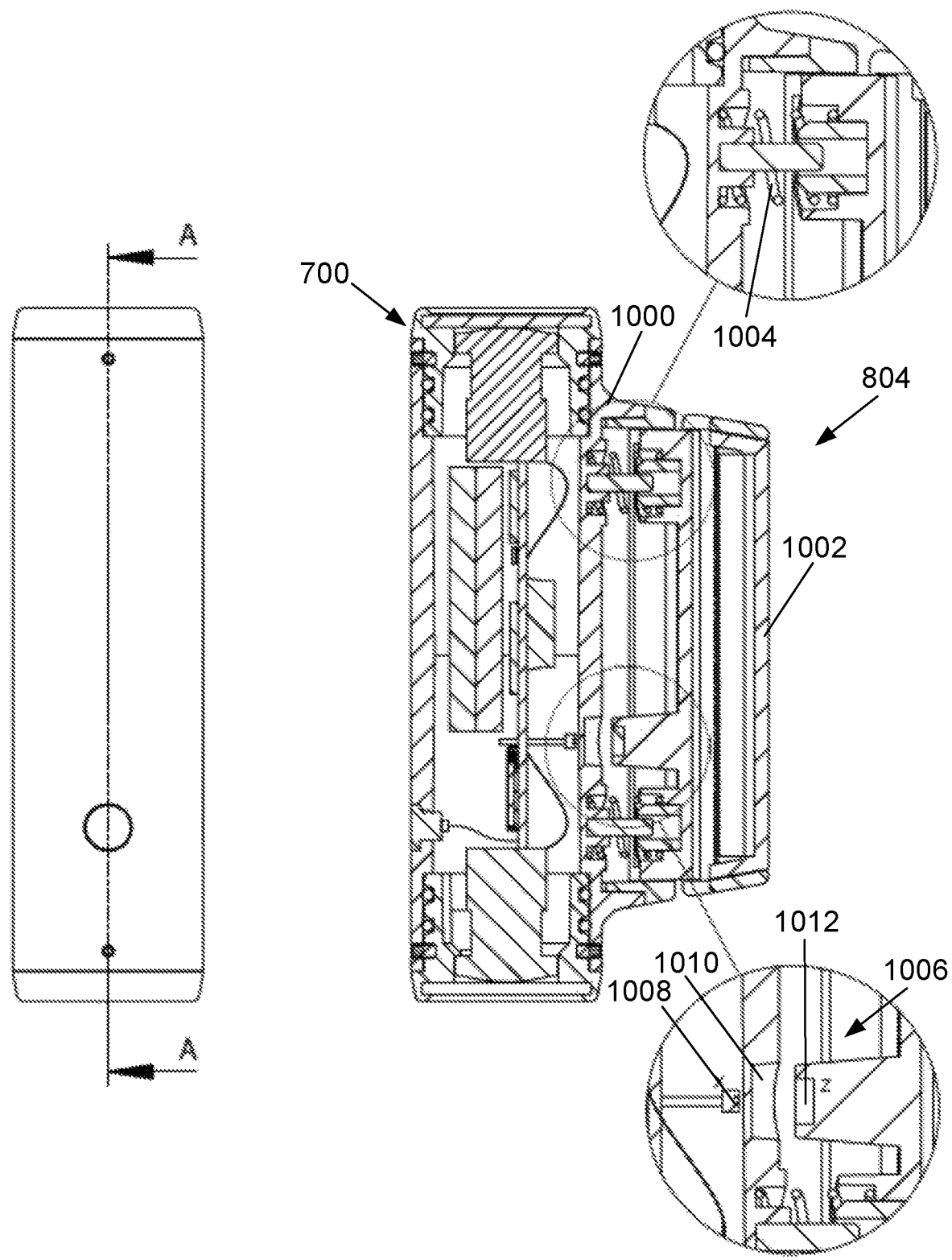
FIG. 10 is a sectional side view of the fishing camera assembly of FIG. 7 showing a proximity switch camera actuator.

Turning to FIG. 10, the tube 804 includes a static base part 1000, and an outer movable finger-grip part 1002 for linearly moving relative to the static part 1000. The lateral channel 900 is formed when the parts 1000, 1002 are squeezed toward each other as the base part 1000 rests in a hand and the finger-grip part 1002 is pressed by the closing fingers.

The top close-up inset in FIG. 10 more clearly shows that the tube 804 includes compression springs (i.e. biasing means) 1004 for biasing the tube 804 closed.

The bottom close-up inset in FIG. 10 shows a toggle actuator 1006 for actuating the camera 800. The toggle actuator 1006 is configured to begin recording of the camera 800 when the tube 804 is opened, and stop recording of the camera 800 when the tube 804 is opened once more. The actuator 1006 includes a proximity switch 1008 at the bottom of a well 1010 in the base part 1000, and a magnet 1012 on the finger-grip part 1002 that enters the well 1010 to trigger the switch 1008.

Figure 11:
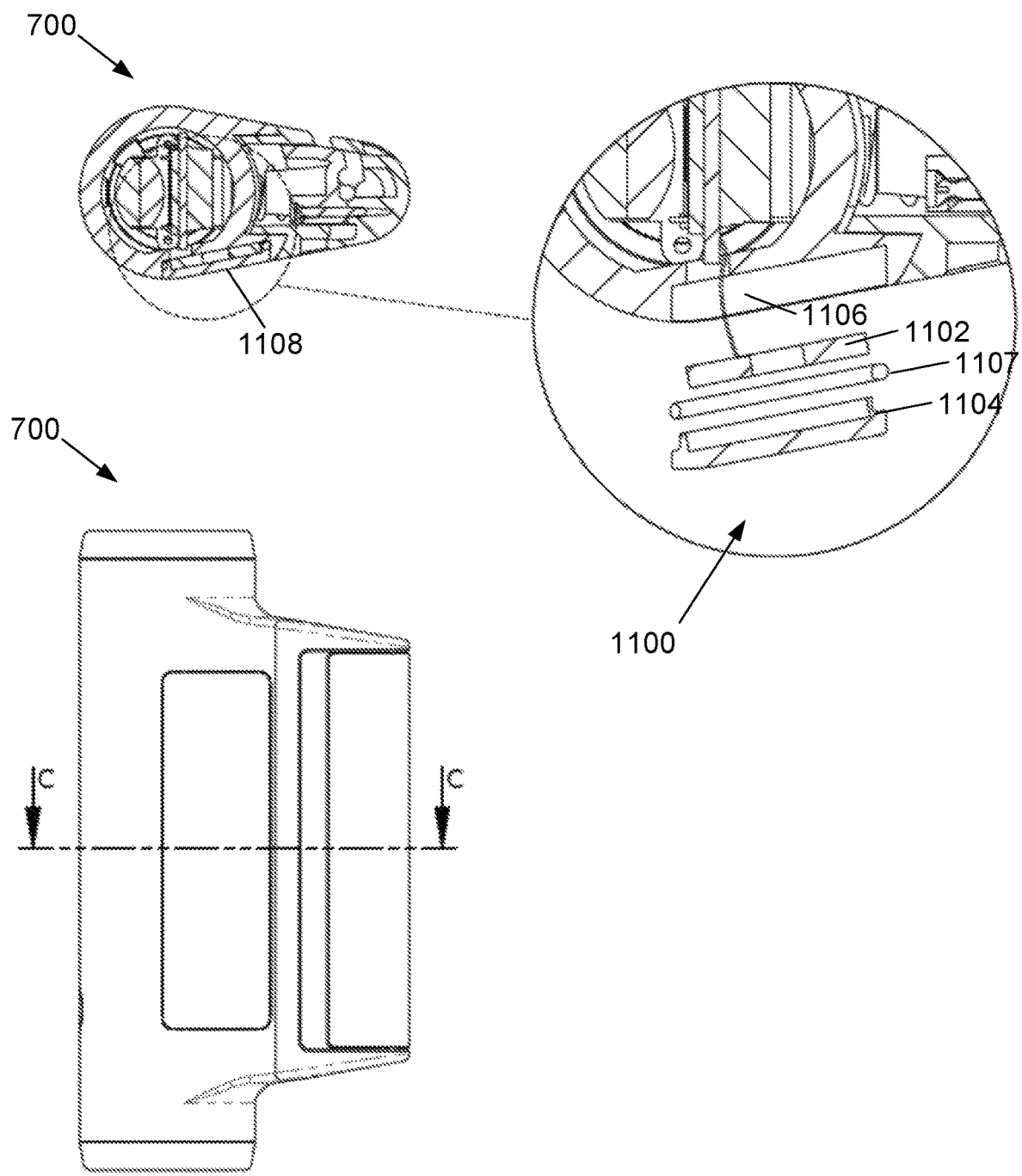
FIG. 11 is a sectioned end view of fishing camera assembly of FIG. 7 showing an induction charger.

Turning to FIG. 11, the assembly 700 further includes an internal battery, and an induction charger 1100 for charging the battery. The charger 1100 includes a wireless Qi charging coil 1102, a cover plate 1104 for covering the coil 1102 in an underside cavity 1106, and an O-ring 1107 for sealing the cover plate 1104 to impede ingress of water into the cavity 1106. During charging, the coil 1102 is located adjacent a parallel resting surface 1108 of the assembly 700 when the surface 1108 rests on an electric excitation pad of the charger 1100.

Figure 12:
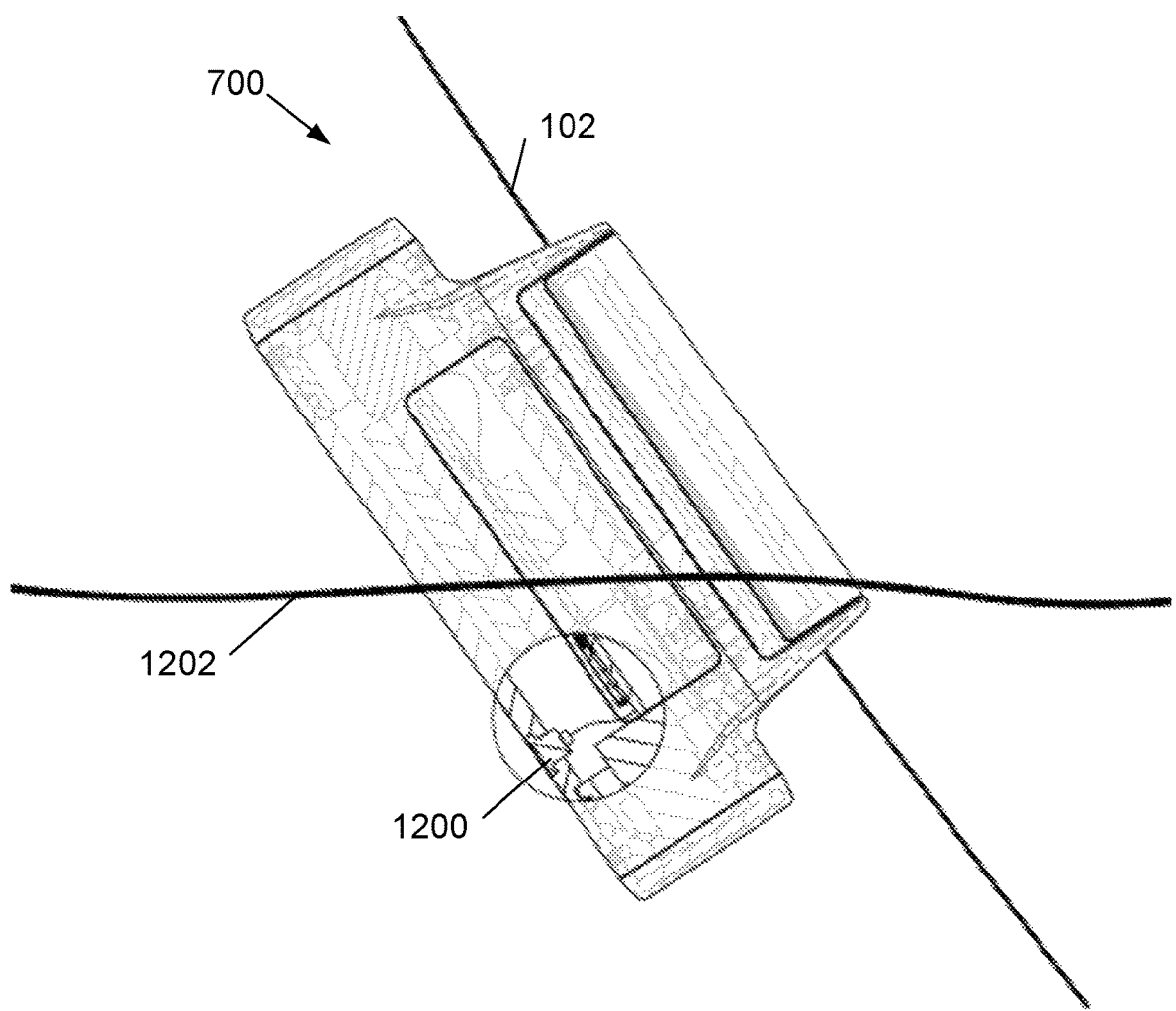
FIG. 12 is a partial side view of the fishing camera assembly of FIG. 7 in use showing a temperature sensor.

Turning to FIG. 12, the assembly 700 further includes a temperature sensor 1200 borne by a submerged portion of the carrier 802 when floating and for sensing the water temperature. The assembly 700 further include a GPS and a clock for keeping time and date. An onboard transmitter is provided for transmitting information including the sensed water temperature, GPS co-ordinates from the GPS, and time and date from the clock. The user has a mobile phone loaded with application software (i.e. an App) configured to receive the transmitted information from the assembly 700, as well as associated caught fish species entered by the user, to build a fish database for fish conservation purposes.

The assembly 700 can further include a mechanical gyro stabilizer for stabilizing the orientation of the internal camera 800 as the outer carrier 802 moves and bobs on the water surface 1202 so that the captures images are smooth and perpendicular to the horizon.

Figure 13:
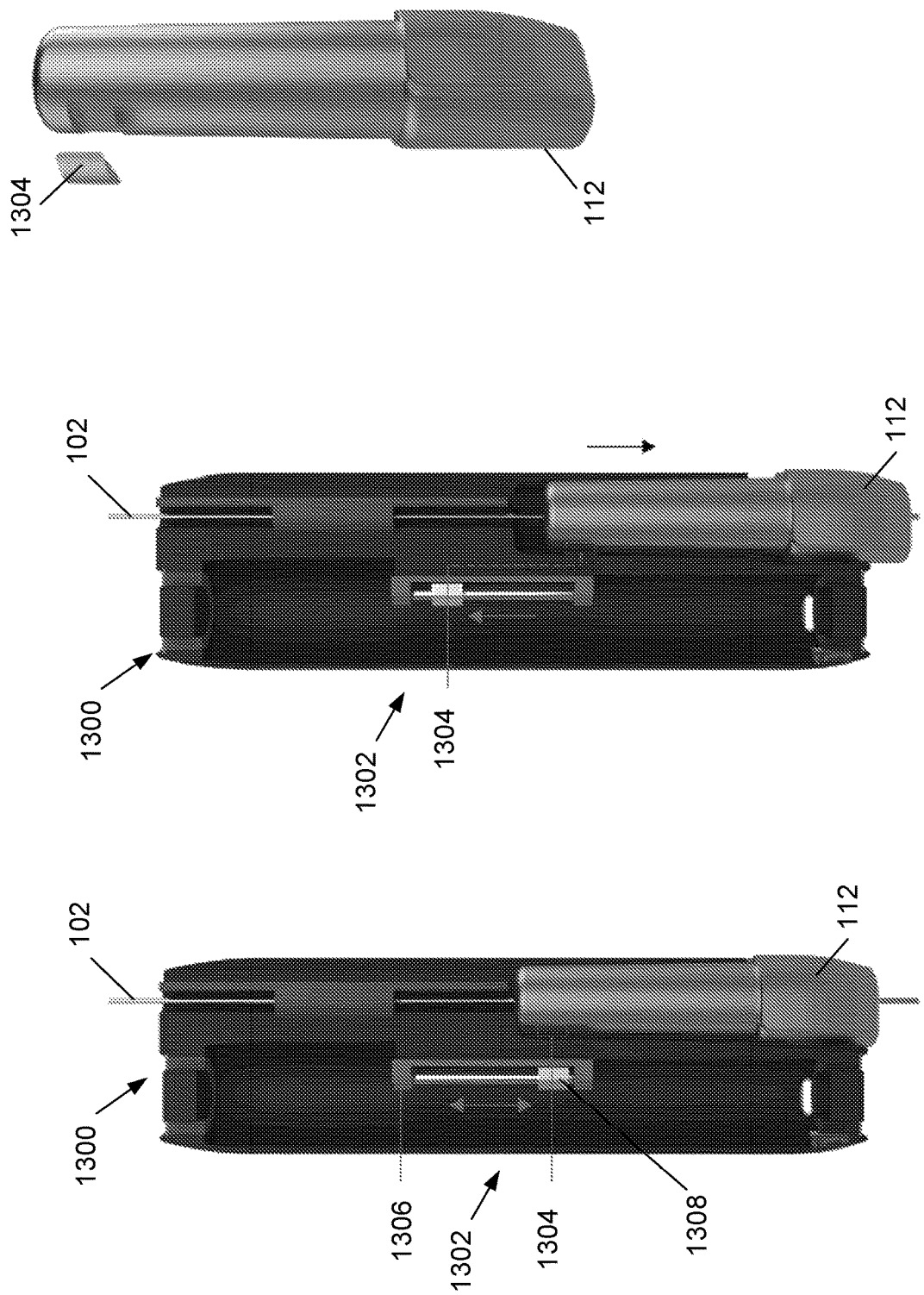
FIG. 13 shows a weighted camera arrangement with release.

As in the first embodiment, the camera 800 and carrier 802 of the fishing camera assembly 700 form a camera unit 1300 as shown in FIG. 13. The assembly 700 can once again further include a weight 112 for weighting the camera unit 1300 to pass along the fishing line 102.

A release 1302 is provided for releasing the camera unit 1300 from the weight 112. The release 1302 includes a metal plate 1304 mounted to the top of the weight 112, and a linear motor 1306 mounted to the camera unit 1300 and carrying a magnet 1308. In use, the motor 1306 carries the magnet 1308 up and away from the metal plate 1304 it holds to release the weight 112. The motor 1306 may be actuated in this manner by a timer.

A person skilled in the art will appreciate that many embodiments and variations can be made without departing from the ambit of the present invention.

In one embodiment, the camera 110 continues to take image footage through the bottom lens 208 after separation of the camera 110 and weight 112, for a predetermined time monitored by the timer, before switching to take footage through the upper lens 208. In this manner, more footage is provided to positively identify the fish species. In another embodiment, the camera 100 can simultaneously take image footage though both lenses 208 so that footage of both the fish and angler is captured as the fish draws near the angler.

In one embodiment, the camera 110 includes an override for inhibiting the release of the weight 112.

In one embodiment, the camera 110 and/or weight 112 include a fin to inhibit rotation during decent along the line 102.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The claims defining the invention are as follows:

1. A fishing camera assembly for coupling to a fishing line, the assembly including:
   a camera with two opposite ends; and
   a carrier for carrying the camera along the line, the carrier including an openable surround that surrounds the line;
   wherein the camera is fitted with two camera lenses at respective ends, with fields of vision in opposite directions, and is configured to concurrently capture one or more images downward along the line and to capture one or more images upward along the line through the other one of the lenses.

2. A fishing camera assembly as claimed in claim 1, wherein the surround can be compressed to open and receive the line, before being released to close the surround and secure the line.

3. A fishing camera assembly as claimed in claim 1, wherein the surround includes biasing means for biasing the surround closed.

4. A fishing camera assembly as claimed in claim 1, wherein the surround includes a static part, and a movable part for moving relative to the static part.

5. A fishing camera assembly as claimed in claim 4, wherein the movable part moves linearly or translates relative to the static part.

6. A fishing camera assembly as claimed in claim 4, wherein the parts define a lateral channel for receiving the line.

7. A fishing camera assembly as claimed in claim 4, wherein the lateral channel is formed when the parts are moved toward each other.

8. A fishing camera assembly as claimed in claim 1, further including an actuator for actuating the camera.

9. A fishing camera assembly as claimed in claim 8, wherein the actuator is a toggle actuator.

10. A fishing camera assembly as claimed in claim 9, wherein the toggle actuator is configured to begin recording of the camera when the surround is opened, and stop recording of the camera when the surround is opened once more.

11. A fishing camera assembly as claimed in claim 8, wherein the actuator includes a proximity switch.

12. A fishing camera assembly as claimed in claim 11, wherein the proximity switch is magnetic.

13. A fishing camera assembly as claimed in claim 1, further including a battery, and a charger for charging the battery.

14. A fishing camera assembly as claimed in claim 13, wherein the charger includes an induction charger.

15. A fishing camera assembly as claimed in claim 14, wherein the charger includes a wireless charging coil located adjacent a resting surface of the carrier.

16. A fishing camera assembly as claimed in claim 1, further including a temperature sensor borne by a submerged portion of the carrier when floating for sensing the water temperature, a GPS and/or a clock.

17. A fishing camera assembly as claimed in claim 1, further including a stabilizer for stabilizing the orientation of the camera as the carrier moves.

18. A fishing camera assembly as claimed in claim 1, further including a transmitter for transmitting information including one or more of: the sensed water temperature, GPS co-ordinates from the GPS and time and date from the clock.

19. A fishing camera assembly as claimed in claim 1, further including software configured to receive transmitted information from the assembly as well as associated caught fish species to build a fish database for fish conservation purposes.

* * * * *